US011067167B2

(12) United States Patent
Iizumi et al.

(10) Patent No.: US 11,067,167 B2
(45) Date of Patent: Jul. 20, 2021

(54) CONTROL DEVICE AND CONTROL METHOD FOR LOCK-UP CLUTCH

(71) Applicant: JATCO LTD, Fuij (JP)

(72) Inventors: Takehiro Iizumi, Kanagawa (JP); Toshiaki Noda, Kanagawa (JP); Takahiro Yamada, Kanagawa (JP); Takashi Koguchi, Kanagawa (JP); Yuichi Ishiyama, Tochigi (JP)

(73) Assignee: Jatco Ltd., Fuji (JP)

( * ) Notice: Subject to any disclaimer, the term of this patent is extended or adjusted under 35 U.S.C. 154(b) by 96 days.

(21) Appl. No.: 16/478,572

(22) PCT Filed: Jan. 31, 2018

(86) PCT No.: PCT/JP2018/003149
§ 371 (c)(1),
(2) Date: Jul. 17, 2019

(87) PCT Pub. No.: WO2018/143249
PCT Pub. Date: Aug. 9, 2018

(65) Prior Publication Data
US 2020/0049251 A1 Feb. 13, 2020

(30) Foreign Application Priority Data
Jan. 31, 2017 (JP) .............................. JP2017-015836

(51) Int. Cl.
F16H 61/14 (2006.01)
F16D 48/06 (2006.01)
(Continued)

(52) U.S. Cl.
CPC ........... *F16H 61/14* (2013.01); *F16D 48/066* (2013.01); *F16H 61/12* (2013.01);
(Continued)

(58) Field of Classification Search
CPC ........ F16H 61/12; F16H 61/14; F16H 61/143; F16H 2061/1232; F16H 2061/1276;
(Continued)

(56) References Cited

U.S. PATENT DOCUMENTS 4,428,467 A 1/1984 Hiramatsu
5,613,583 A 3/1997 Kono et al.
(Continued)

FOREIGN PATENT DOCUMENTS

JP 62-007430 B2 2/1987
JP 08-086356 A 4/1996
(Continued)

*Primary Examiner* — David R Morris
*Assistant Examiner* — Lori Wu
(74) *Attorney, Agent, or Firm* — Global IP Counselors, LLP

(57) ABSTRACT

A control device for a lock-up clutch includes a control unit, an abnormality determination unit, a release control unit and a prohibition unit. The control unit is configured to control an engagement state of a lock-up clutch, and to perform a slip lock-up control by performing a feedback control of an engagement hydraulic pressure to be a first slip amount during coasting. The abnormality determination unit is configured to determine an abnormality when a state continues with a slip amount being equal to or greater than a second slip amount. The release control unit is configured to release the lock-up clutch when the abnormality is determined. The prohibition unit is configured to allow the control unit to raise the engagement hydraulic pressure by a prescribed pressure, and to prohibit determination by the abnormality determination unit, when the transmission ratio is downshifted during coasting while the slip lock-up control is performed.

4 Claims, 3 Drawing Sheets

(51) Int. Cl.
*F16H 61/12* (2010.01)
*F16H 45/02* (2006.01)
*F16H 59/38* (2006.01)
*F16H 59/46* (2006.01)
*F16H 59/72* (2006.01)

(52) U.S. Cl.
CPC .............. *F16H 2045/0294* (2013.01); *F16H 2059/385* (2013.01); *F16H 2059/467* (2013.01); *F16H 2059/725* (2013.01)

(58) Field of Classification Search
CPC ......... F16H 2061/147; F16H 2061/145; F16H 2061/1256; F16H 2061/0015; F16H 2045/0294; F16H 48/066; F16H 48/06; F16H 2059/385; F16H 2059/467; F16H 2059/725; F16D 2500/10487; F16D 2500/30406; F16D 2500/30806; F16D 2500/5085; F16D 2500/5102; F16D 2500/70406; F16D 2500/7105
See application file for complete search history.

(56) References Cited

U.S. PATENT DOCUMENTS

| | | | | |
|---|---|---|---|---|
| 5,935,043 A | * | 8/1999 | Watanabe | F16H 61/143 477/169 |
| 2004/0102288 A1 | * | 5/2004 | Ayabe | B60W 30/18 477/117 |
| 2007/0142173 A1 | * | 6/2007 | Kawamura | F16H 61/0021 477/156 |
| 2010/0131160 A1 | * | 5/2010 | Ayabe | F02D 41/126 701/54 |
| 2014/0025269 A1 | * | 1/2014 | Ayabe | F16D 25/12 701/60 |

FOREIGN PATENT DOCUMENTS

| | | |
|---|---|---|
| JP | 2001-221341 A | 8/2001 |
| JP | 2011-169389 A | 9/2011 |

* cited by examiner

CONTROL DEVICE AND CONTROL METHOD FOR LOCK-UP CLUTCH

CROSS-REFERENCE TO RELATED APPLICATIONS

This is a U.S. national phase application of PCT/JP2018/003149, filed on Jan. 31, 2018, which claims priority to Japanese Patent Application No. 2017-015836, filed on Jan. 31, 2017. The entire disclosure of Japanese Patent Application No. 2017-015836 is hereby incorporated herein by reference.

TECHNICAL FIELD

The present invention relates to a control device and a control method for a lock-up clutch that controls the engagement state of a lock-up clutch provided with a torque converter.

BACKGROUND ART

In Japanese Patent Publication No. S62-7430, disclosed is a technique for releasing a lock-up clutch when the state of the slip amount being a fixed level or greater continues to be a fixed time or greater when doing feedback control of the slip amount of the lock-up clutch.

Here, during coasting, by an automatic transmission shifting to the low side, and the turbine rotation speed rising, despite being normal, the slip amount of the lock-up clutch may increase. However, with the technique of Japanese Patent Publication No. S62-7430, a judgment of abnormal is made, and the lock-up clutch is released. Having done that, it is necessary to restart fuel injection to rotate independently, and there was the problem that fuel consumption deteriorated.

The purpose of the present invention is to provide a control device for a lock-up clutch capable of avoiding deterioration of fuel consumption.

SUMMARY

With the control device for a lock-up clutch of the present invention, when controlling the engagement state of the lock-up clutch of a torque converter provided between an engine and an automatic transmission, and the state of the slip amount of the lock-up clutch being a prescribed amount or greater continues, an abnormality is determined, and for releasing of the lock-up clutch, it was made possible to prohibit an abnormal determination when the automatic transmission is shifted to the low side during coasting.

Thus, it is possible to avoid releasing of the lock-up clutch due to an abnormality determination, and by maintaining the engine rotation speed at higher than the idle rotation speed, it is possible to suppress the engine independent operation section that accompanies fuel injection, and possible to avoid deterioration of fuel consumption.

DETAILED DESCRIPTION OF EMBODIMENTS

Figure 1:
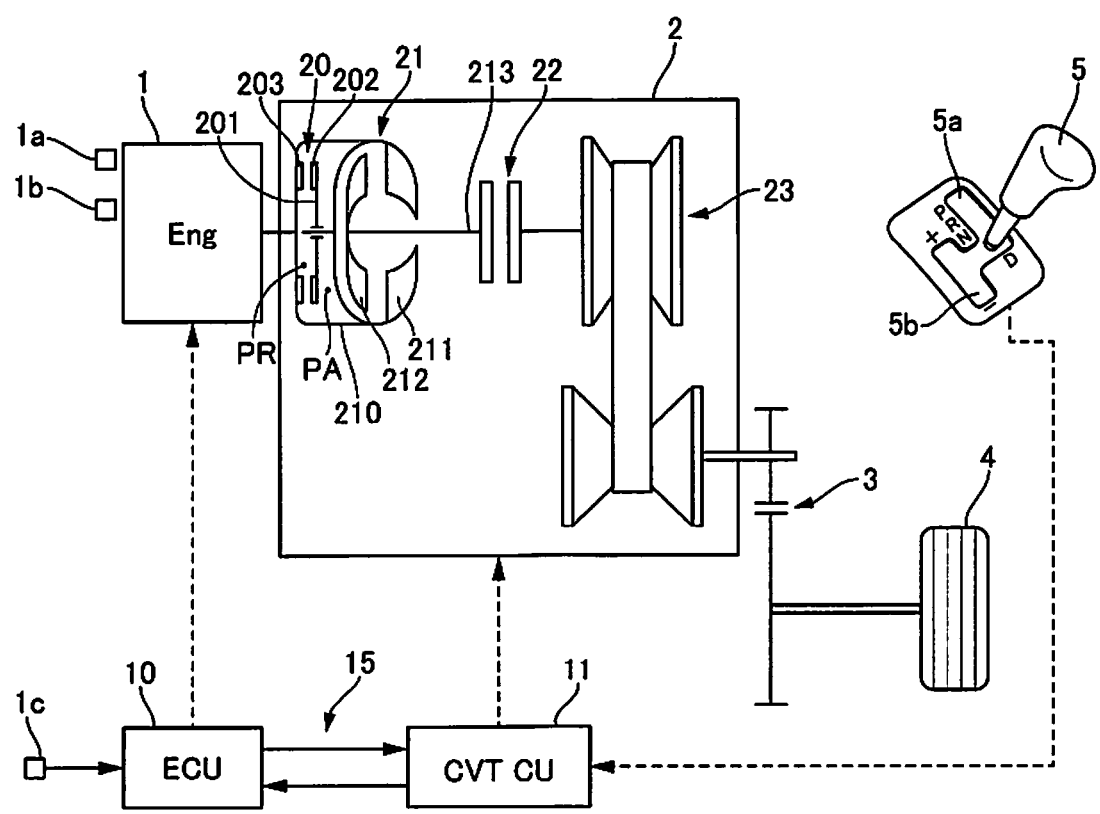
FIG. 1 is a system diagram of a vehicle to which the control device for a lock-up clutch of this embodiment is applied.

FIG. 1 is a system diagram of a vehicle to which the control device for a lock-up clutch of this embodiment is applied. The rotation that is output from an engine 1, which is an internal combustion engine, is input to an automatic transmission 2. The rotation that is input to the automatic transmission 2 is input to a belt type continuously variable transmission mechanism 23 via a torque converter 21 and a clutch 22 provided with a lock-up clutch 20.

The torque converter 21 has: a converter cover 210 connected to an engine output shaft; a pump impeller 211 attached to the converter cover 210; and a turbine runner 212 placed at a position facing opposite the pump impeller 211. The turbine runner 212 rotates as an integrated unit with a turbine shaft 213 connected with the engine side rotation elements of the clutch 22.

The lock-up clutch 20 has: a friction material 203 provided on the engine side inner wall of the converter cover 210; a clutch plate 201 that is slideable in the axis direction at the engine side end part of the turbine shaft 213; and a plate side friction material 202 placed at a position facing opposite the friction material 203 at the outer periphery of the clutch plate 201. The clutch plate 201 separates a release chamber PR of the friction material 203 side and a converter chamber PA of the turbine runner 212 side. The differential pressure of the release chamber PR and the converter chamber PA is noted hereafter as lock-up differential pressure PLU. When release pressure is supplied to the release chamber PR, the lock-up differential pressure PLU decreases, and the clutch plate 201 moves to the release side. Meanwhile, when the supply of release pressure to the release chamber PR is decreased, and the converter pressure is supplied to the converter chamber PA, the lock-up differential pressure PLU increases, and the clutch plate 201 moves to the engagement side. By doing this, the friction material 203 and the plate side friction material 202 are in contact, and the relative rotation of the converter cover 210 and the turbine shaft 213 are regulated.

The clutch 22 is a multiplate wet clutch for which a plurality of clutch plates are alternately overlapped, and transmission torque capacity is controlled based on control oil pressure supplied from a control valve outside the drawing. In the case of the embodiment, in a forward-reverse switching mechanism outside the drawing, an engagement element for achieving forward and an engagement element for achieving reverse respectively correspond to the clutch 22, but there is no specific restriction, and it is also possible to provide a clutch dedicated to starting separate from the forward-reverse switching mechanism. The rotation that was shifted by the belt type continuously variable transmission mechanism 23 is transmitted to a drive wheel 4 with a final gear 3 interposed. The engine 1 has a throttle valve 1a for adjusting the intake air amount and a fuel injection device 1b.

A shift lever 5 operated by a driver has the range position of a shift range 5a switched by operation. The shift range 5a has a parking range, a reverse range for going in reverse, a neutral range, and a drive range for going forward, and range position signals are output according to the operating position of the shift lever 5. Also, at the left side of the drive range, there is a manual range 5b for changing the transmission ratio in steps. The manual range 5b of the embodiment has a + switch at one side and a − switch at the other side, and when the driver operates the shift lever 5 to the + switch side, a switch upshift signal is output, and upshifting is performed in steps. Meanwhile, when the driver operates the shift lever 5 to the − switch side, a switch downshift signal is output, and downshifting is performed in steps.

The engine control unit 10 (hereafter noted as ECU) outputs a control signal to the throttle valve 1a and the fuel injection device 1b of the engine 1, and controls the driving state of the engine 1 (engine rotation speed Ne and engine torque Te). An idle switch 1c outputs an on signal to the ECU when the accelerator pedal opening APO is less than a prescribed value, and outputs an off signal in other cases. When an on signal is received from the idle switch 1c, the ECU implements idle control to maintain the engine rotation speed Ne at the idle rotation speed regardless of the accelerator pedal opening APO. Also, the ECU has a fuel cut control unit, and when the engine rotation speed Ne is at the idle rotation speed or greater, and the accelerator pedal opening APO is at less than a prescribed value representing a foot release state, fuel cut control (hereafter noted as FC) that stops fuel injection from the fuel injection device 1b is implemented, and fuel consumption is improved. Also, during FC, when the engine rotation speed Ne goes below the idle rotation speed, fuel injection is started again, and the engine 1 maintains a state of independent operation being possible without using the starter motor, etc.

A transmission control unit 11 (hereafter noted as CVTCU) receives range position signals sent from the shift range 5a and switch shift signals sent from the manual range 5b, and controls a disconnect state of the clutch 22, or the transmission ratio of the belt type continuously variable transmission mechanism 23. The CVTCU has a gear shift map for setting the transmission ratio to continuously variable so as to ensure the optimal fuel consumption of the engine 1 based on the vehicle speed and the accelerator pedal opening. This gear shift map has a plurality of fixed transmission ratio lines set when the shift lever 5 is moved to the manual range 5b. In a state in which a certain fixed transmission ratio line is selected, when the switch upshift signal is input, the transmission ratio is upshifted from the current fixed transmission ratio line to a high side fixed transmission ratio line, and when a switch downshift signal is input, the transmission ratio is downshifted from the current fixed transmission ratio line to a low side fixed transmission ratio line. By doing this, the transmission ratio is controlled like a stepped automatic transmission, realizing travel according to the intention of the driver. The ECU and the CVTCU are connected by a CAN communication line 15 that can mutually send and receive information.

Lock-up Clutch Control Process

Here, control of the lock-up clutch 20 is explained. Normally, during starting of a vehicle, etc., in a scene when large torque is necessary, the lock-up clutch 20 is released, and the torque amplification action of the torque converter 21 is made to function. However, when the vehicle speed reaches a prescribed vehicle speed or greater, with the goal of improving fuel consumption, the lock-up differential pressure PLU is generated to engage the lock-up clutch 20 (hereafter noted as lock-up state), and the torque that is output from the engine 1 is transmitted as is to the belt type continuously variable transmission mechanism 23. Also, when the vehicle speed decreases in the lock-up state, the engine rotation speed Ne falls below the idle rotation speed by a decrease in the rotation speed of the drive wheel 4, and there is a risk of causing engine stall. In light of that, in the low vehicle speed region, slip lock-up control is performed while doing feedback control so as to have the difference between the engine rotation speed Ne and the turbine rotation speed Nt be a preset first slip amount. By doing this, control is done so that the engagement state of the lock-up clutch 20 is an engagement state just about to slip, and the state is such that the clutch plate 201 can move instantly.

Here, we will assume a scene in which the manual range 5b is selected, coasting is done at a certain fixed transmission ratio, and slip lock-up control is performed. At this time, when the driver operates the shift lever 5 and the − switch turns on, downshifting is started toward a lower side fixed transmission ratio than the current fixed transmission ratio. Having done that, to increase the rotation speed of the turbine shaft 213 all at once, the rotation speed of the clutch plate 201 becomes higher than the rotation speed of the converter cover 210 (same as the engine rotation speed Ne). Having done that, with the current lock-up differential pressure PLU, the engine side inertia torque amount is insufficient, and it is not possible to pull up the engine rotation speed Ne, so the differential rotation of the engine rotation speed Ne and the turbine rotation speed Nt becomes greater than a prescribed differential rotation speed.

The CVTCU has: an abnormality determination unit that, when implementing slip lock-up control of the lock-up clutch 20, when the state continues of the differential rotation being in a state with the second slip amount being greater than the first slip amount, determines that there is an abnormality; and a release control unit that, when it is determined by the abnormality determination unit that there is an abnormality, stops the feedback control and releases the lock-up clutch 20. This is because it is assumed that with continuation of an excessive slip state, there are cases when there is a decrease in durability of the friction material 203 or the plate side friction material 202.

However, when the lock-up clutch 20 is released, the engine rotation speed Ne easily decreases, and the timing for stopping fuel cut control and restarting fuel injection is earlier, bringing deterioration of fuel consumption. Thus, it is desirable to maintain the engine rotation speed Ne to be high by engagement of the lock-up clutch 20. Also, if there is simply a rise in the differential rotation accompanying the switch downshift, a decrease in durability of the friction material, etc., is not the cause, and if in a state for which the turbine rotation speed Nt is higher than the engine rotation speed Ne, there is no causing of engagement shock accompanying a reversal of centrifugal hydraulic pressure. In light of that, with the embodiment, when switch downshifting is performed during slip lock-up control during coasting, an abnormality determination by the abnormality determination unit is prohibited, and by adding the engine side inertia torque amount to the lock-up differential pressure PLU, the slip lock-up control is continued in an attempt to improve fuel consumption.

Figure 2:
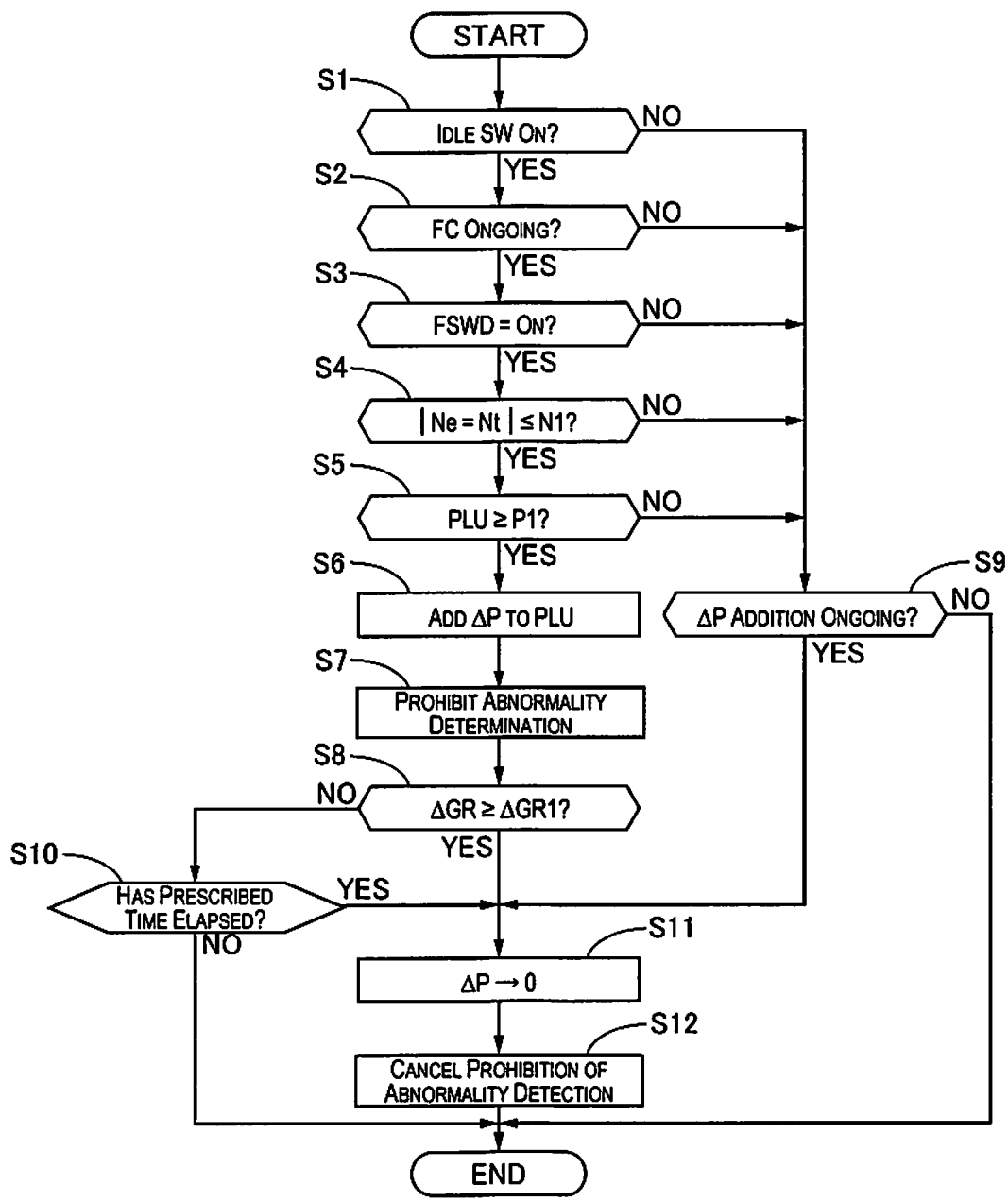
FIG. 2 is a flow chart representing the control process at the time of switch downshift during slip lock-up control of the embodiment.

FIG. 2 is a flow chart representing the control process during switch downshift during the slip lock-up control of the embodiment.

At step S1, a judgment is made of whether the idle switch 1c is on, and when on, the process advances to step S2, and in other cases, the process advances to step S9. This is to confirm the establishment of the coasting conditions.

At step S2, a judgment is made of whether currently doing fuel cutting, and when currently doing fuel cutting, it is judged that torque fluctuation that accompanies fuel cutting will not occur, and the process advances to step S3, and in other cases, the process advances to step S9.

At step S3, a judgment is made of whether a switch downshift flag FSWD is on, and when on, it is judged that downshift due to switch downshift will occur, and the process advances to step S4, and in other cases, the process advances to step S9.

At step S4, a judgment is made of whether the slip amount, which is the absolute value of the difference between the engine rotation speed Ne and the turbine rotation speed Nt, is a prescribed slip amount N1 or less, and when it is N1 or less, the process advances to step S5, and in other cases, the process advances to step S9. Specifically, this is because when the slip amount is N1 or greater, and a prescribed pressure is added to the lock-up differential pressure PLU, there is the risk of causing engagement shock when the lock-up clutch 20 is engaged suddenly.

At step S5, a judgment is made of whether the lock-up differential pressure PLU is the prescribed pressure P1 or greater, and when P1 or greater, the process advances to step S6, and in other cases, the process advances to step S9. Specifically, this is because when the lockup differential pressure PLU is a negative value, for example, there is a possibility that the clutch plate 201 will move to the release side, and in that case, when the prescribed pressure is added to the lock-up differential pressure PLU, there is a risk of causing engagement shock when the lock-up clutch 20 is engaged suddenly.

At step S6, a prescribed pressure ΔP correlating to the engine side inertia torque amount is added to the lock-up differential pressure PLU. By doing this, it is possible to pull up the engine rotation speed Ne along with a rise in the turbine rotation speed Nt.

At step S7, abnormality determination by the abnormality determination unit is prohibited. Thus, even on the chance that the slip amount increases, it is possible to continue performing feedback control of the lock-up differential pressure PLU without releasing the lock-up clutch 20.

At step S8, a judgment is made of whether the gear ratio change amount ΔGR is a prescribed change amount ΔGR1 or greater after the switch downshift flag FSWD turns on, and when the ΔGR changes by the ΔGR1 or greater, the process advances to step S11, and in other cases, the process advances to step S10.

At step S9, a judgment is made of whether currently adding the ΔP to the lock-up differential pressure PLU, and when currently adding, the process advances to step S11, and in other cases, this control flow ends, and the process repeats from step S1.

At step S10, a judgment is made of whether a prescribed time has elapsed since the addition of ΔP to the lock-up differential pressure PLU, and if the prescribed time has not elapsed, this control flow ends, and the process repeats from step S1. Specifically, even when the prescribed time has elapsed after the addition of ΔP to the lock-up differential pressure PLU, when the slip amount has not decreased, rather than an increase in the slip amount accompanying the switch downshift, it is thought that there is an increase in the slip amount due to other causes. Also, when feedback control continues in a state with the slip amount being large, the lock-up differential pressure PLU is set to increasingly larger values, and there is the risk of causing engagement shock when the lock-up clutch 20 is engaged. Thus, after elapsing of the prescribed time, the process advances from S11→S12, the prohibition of abnormality determination is released, and by releasing the lock-up clutch 20, shock, etc., accompanying re-engagement is avoided.

At step S11, when it is judged that any of the conditions of step S1 to S5 is not established, or that the downshift by switch downshift has not progressed sufficiently, the added ΔP is gradually reduced toward 0. At this time, when ΔP is suddenly reduced, there is a risk of causing torque fluctuation by reducing the lock-up differential pressure PLU all at once, so a change rate limiter, etc., is set, and decreasing is done gradually.

At step S12, the abnormality determination that was prohibited at step S7 is released, and by allowing abnormality determination by the abnormality determination unit, the system moves to normal lock-up control.

Figure 3:
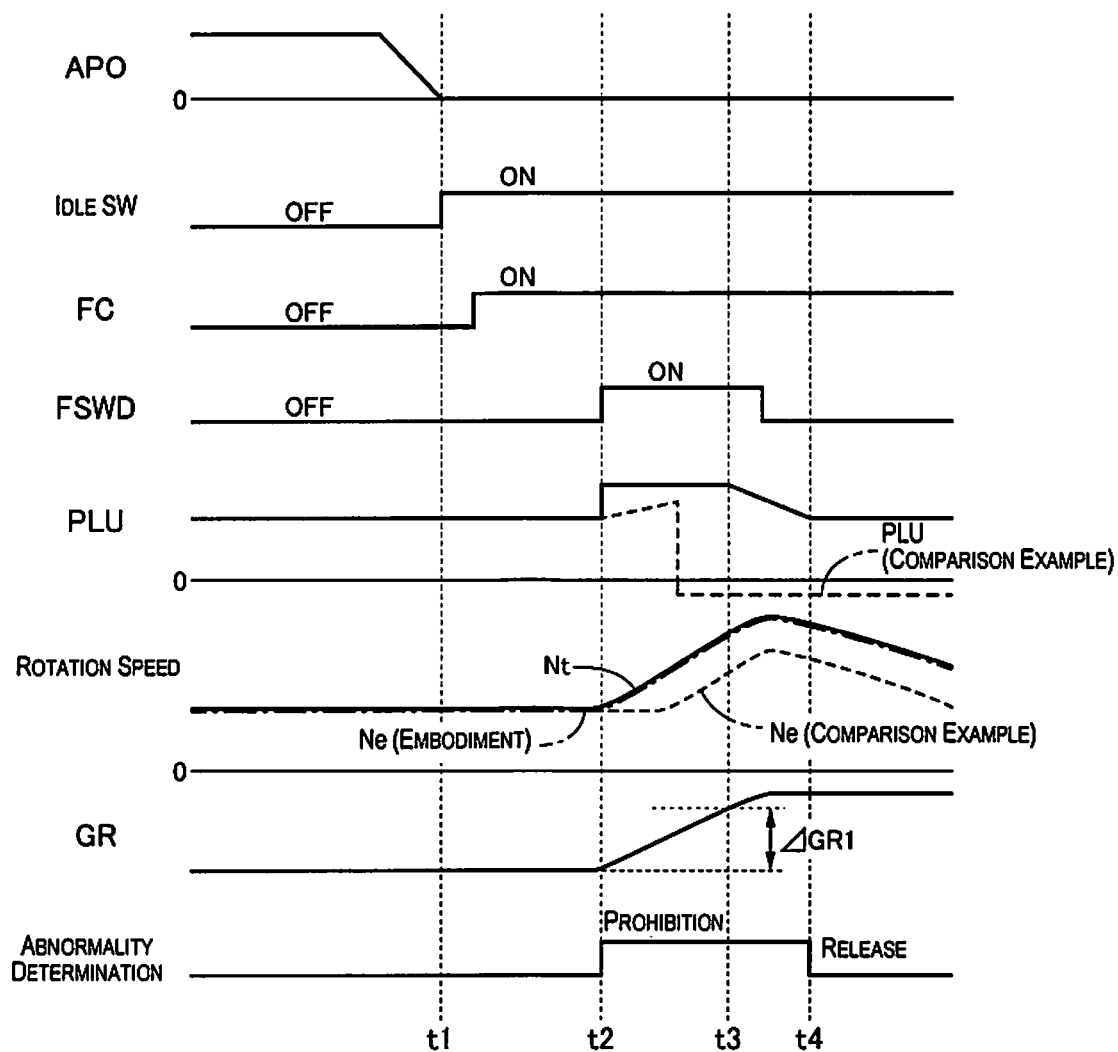
FIG. 3 is a time chart representing the control process at the time of switch downshift during slip lock-up control of the embodiment.

FIG. 3 is a time chart representing the control process during switch downshift during the slip lock-up control of the embodiment. The dotted lines noted in the column of the PLU and the rotation speed in the drawing represent a comparison example when control was not performed during the switch downshift. Represented is a time when, at the initial point in time of this time chart, there is an acceleration state with the accelerator pedal pressed, and from this state the accelerator pedal is released, to move to a coasting state.

At time t1, the accelerator pedal opening APO is less than a prescribed value, and the idle switch 1c is on. After that, the engine rotation speed Ne is maintained at the idle rotation speed or greater by torque from the drive wheel 4 via the lock-up clutch 20, and fuel injection is stopped by FC control.

At time t2, when the driver operates the shift lever 5, and performs the switch downshift, the switch downshift flag FSWD turns on. In the case of the comparison example, the engine rotation speed Ne cannot keep up with the rise in the turbine rotation speed Nt, and even if feedback control is performed, the slip amount exceeds the second slip amount. At this time, abnormality determination by the abnormality determination unit is not prohibited, so this is determined as abnormal and the lock-up clutch 20 is released. Having done that, the engine rotation speed Ne decreases early, so fuel injection restarts and independent rotation is done, inviting deterioration of fuel consumption by reducing the sections in which FC control can be implemented.

In contrast to this, with the embodiment, ΔP is added to the lock-up differential pressure PLU, and also the abnormality determination by the abnormality determination unit is prohibited. By doing this, when the turbine rotation speed Nt rises, the engine rotation speed Ne is also pulled up simultaneously, so the lock-up clutch 20 is not released. Also, even if the slip amount increases temporarily, abnormality detection is prohibited, and by feedback control continuing to be performed, it is possible for slip lock-up control to continue. Thus, it is possible to maintain a high engine rotation speed Ne, and it is possible to avoid deterioration of fuel consumption by ensuring a section in which it is possible to implement FC control.

At time t3, after the switch downshift flag FSWD is turned on, the change amount ΔGR of the gear ratio changes by a prescribed change amount ΔGR1 or greater, so ΔP is gradually decreased toward 0. At this stage, the engine rotation speed Ne has also risen sufficiently, and the inertia torque is also unnecessary, so the slip amount of the lock-up clutch 20 does not increase. After the gear ratio has changed by ΔGR1, the switch downshift ends.

At time t4, when ΔP becomes 0, prohibition of abnormality determination by the abnormality determination unit is released. Thus, thereafter, normal slip lock-up control is continued.

As explained above, the following operational effects are obtained with the embodiment noted above.

(1) Provided are: the control unit for controlling the engagement state of the lock-up clutch 20 of the torque converter 21 provided between the engine 1 and the belt type continuously variable transmission mechanism 23 (automatic transmission); the abnormality determination unit that determines an abnormality when the state continues of the slip amount of the lock-up clutch 20 being a prescribed level or greater; a release control unit for releasing the lock-up clutch 20 when an abnormality is determined by the abnormality determination unit; and steps S1, S3, and S7 (prohibition unit) that, during coasting, when the belt type continuously variable transmission mechanism 23 is shifted to the low side, prohibits determination by the abnormality determination unit.

Thus, it is possible to avoid the release of the lock-up clutch 20 by the abnormality determination, and by maintaining the engine rotation speed Ne at higher than the idle rotation speed, it is possible to suppress the engine independent operation section that accompanies fuel injection, and to avoid deterioration of the fuel consumption. Furthermore, when trying to achieve deceleration using the engine brake, and in cases when the L range, etc., is selected by the range operation by the driver, it is possible to avoid releasing of the lock-up clutch 20, making it possible to suppress a decrease in the deceleration level by the engine brake. Also, after the range operation, it is possible to suppress the engine from racing under no load even when the accelerator pedal is pressed with the intention of accelerating by the driver.

(2) At step S6 (control unit), when determination by the abnormality determination unit is prohibited by step S7, the engagement hydraulic pressure of the lock-up clutch 20 is raised.

Thus, it is possible to pull up the engine rotation speed Ne accompanying a rise in the turbine rotation speed Nt, and by suppressing an increase in the slip amount, it is possible to improve the durability of the friction material, etc.

(3) At step S6, ΔP, which is the rise amount when the engagement hydraulic pressure of the lock-up clutch 20 is raised, is the input side inertia torque amount of the lock-up clutch 20 when shifted to the low side.

Thus, when the engine rotation speed Ne is pulled up accompanying a rise in the turbine rotation speed Nt, it is possible to avoid an increase in the slip amount, and to further improve durability of the friction material, etc.

(4) At step S10, after a prescribed time has elapsed after raising of the engagement hydraulic pressure of the lock-up clutch 20 by step S6, the prohibition of determination by the abnormality determination unit is released.

Thus, it is possible to avoid engagement shock that occurs by the lock-up clutch 20 engaging in a state with the lock-up differential pressure PLU being set excessively high.

Other Embodiments

Above, the present invention was explained based on an embodiment, but the specific configuration can also be another configuration. With the abovementioned embodiment, an example was shown using the belt type continuously variable transmission mechanism 23 as the transmission, but it is also possible to use another type of transmission. Also, with the abovementioned embodiment, explained was switch downshifting in manual mode of a belt type continuously variable transmission, but the same kind of control can also be used in a case of downshifting by the driver performing a range operation such as to the L rage, S range, etc., to do engine braking or to reaccelerate, and the same kind of control can also be used in a case of making a downshift request by a manual operation by the driver during coasting of a stepped automatic transmission. Also, with the abovementioned embodiment, shown was an example during slip lock-up control, but this is not limited to being during slip lock-up control, and it is also possible to be during normal lock-up control.

The invention claimed is:

1. A control device for a lock-up clutch comprising:
a control unit configured to control an engagement state of the lock-up clutch of a torque converter provided between an engine and an automatic transmission, and to perform a slip lock-up control by performing a feedback control of an engagement hydraulic pressure of the lock-up clutch to be a first slip amount during coasting;
an abnormality determination unit configured to determine an abnormality when a state occurs with a slip amount of the lock-up clutch being equal to or greater than a second slip amount that is greater than the first slip amount;
a release control unit configured to release the lock-up clutch when the abnormality is determined by the abnormality determination unit; and
a prohibition unit configured to allow the control unit to raise the engagement hydraulic pressure of the lock-up clutch by a prescribed pressure, and to prohibit determination by the abnormality determination unit, when a transmission ratio of the automatic transmission is downshifted in response to a driver's downshifting operation of the automatic transmission during coasting while the slip lock-up control is performed.

2. The control device of the lock-up clutch according to claim 1, wherein
a rising amount when the control unit raises the engagement hydraulic pressure of the lock-up clutch is correlated to an input side inertia torque amount of the lock-up clutch when the transmission ratio is downshifted.

3. The control device of the lock-up clutch according to claim 1, wherein
after a prescribed time has elapsed after the engagement hydraulic pressure of the lock-up clutch is raised by the control unit, the prohibition unit is configured to release prohibition of determination by the abnormality determination unit.

4. A control method of a lock-up clutch, comprising:
performing a slip lock-up control by performing a feedback control of an engagement hydraulic pressure of the lock-up clutch of a torque converter provided between an engine and an automatic transmission to be a first slip amount during coasting;
determining an abnormality and releasing the lock-up clutch when a state occurs with a slip amount of the lock-up clutch being equal to or greater than a second slip amount that is greater than the first slip amount; and
raising the engagement hydraulic pressure of the lock-up clutch by a prescribed pressure and prohibiting the abnormality determination when a transmission ratio of the automatic transmission is downshifted in response to a driver's downshifting operation of the automatic transmission during coasting.

* * * * *